United States Patent

[11] 3,588,309

[72] Inventors Shozo Yasukawa
 Kanagawa-ken;
 Masayuki Aoshika, Saitama-ken, Japan
[21] Appl. No. 836,798
[22] Filed June 26, 1969
[45] Patented June 28, 1971
[73] Assignee Ishikawajima-Harima Jukogyo Kabushiki Kaisha
 Tokyo-to, Japan

[54] HEATING METHOD FOR DIRECT-ARC FURNACE
 3 Claims, 6 Drawing Figs.
[52] U.S. Cl.................................................. 13/34, 13/9
[51] Int. Cl...................................................... H05b 3/60,
 H05b 7/10

[50] Field of Search........................................... 13/9, 12,
 13, 34

[56] References Cited
UNITED STATES PATENTS
 858,400 7/1907 Kugelgen, et al............ 13/34
 3,151,266 9/1964 Hannappel, et al.......... 13/34X Primary Examiner—Bernard A. Gilheany
Assistant Examiner—Roy N. Envall, Jr.
Attorney—Nolte and Nolte ABSTRACT: Heating method for direct arc furnaces. At an initial stage of melting the furnace charge, the tips of the electrodes are spaced apart by relatively long distances. As the melting is advanced, this spacing is gradually reduced, while the electrodes are lowered.

PATENTED JUN28 1971
3,588,309
SHEET 1 OF 2
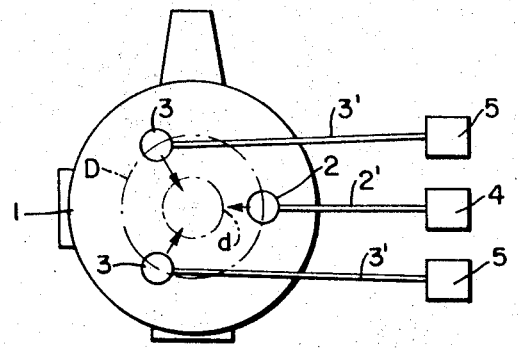
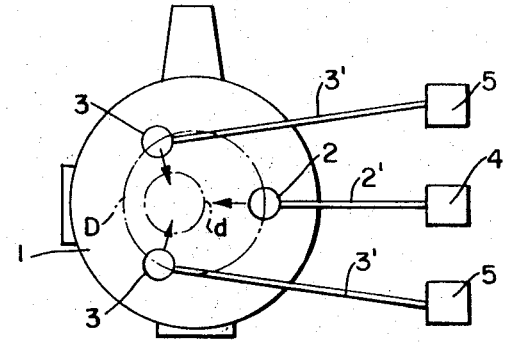
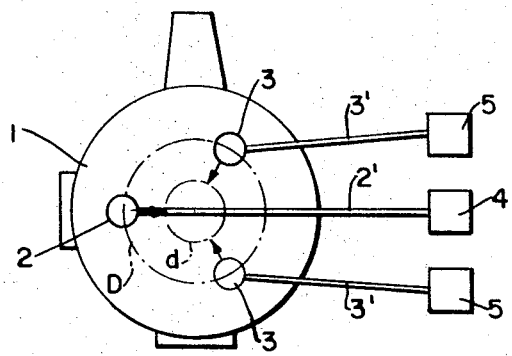
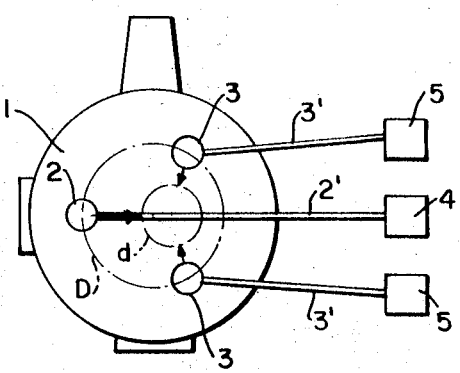
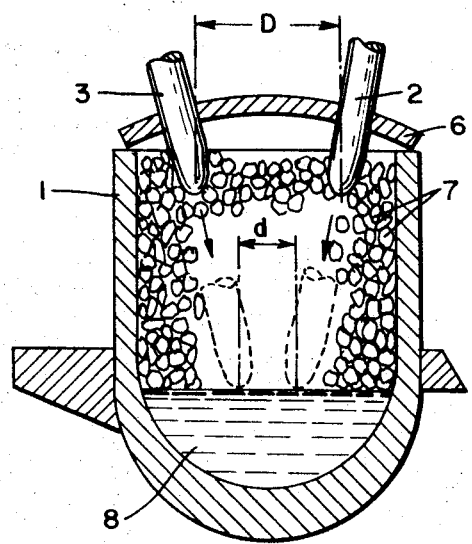
INVENTORS
SHOZO YASUKAWA
MASAYUKI AOSHIKA
BY *Nolte & Nolte*
ATTORNEYS

FIG. 6

COMPARISON OF LINING DAMAGE COEFFICIENT $R_E$ AT 70T ARC FURNACE $$R_E = \frac{P_A \cdot V_A}{L^2} \quad (MW \cdot V/m^2)$$

$\begin{cases} R_E = \text{LINING DAMAGE INDEX} \\ P_A = \text{ARC POWER (MW/POLE)} \\ V_A = \text{ARC VOLTAGE (V)} \\ L = \text{THE MINIMUM DISTANCE IN METERS BETWEEN AN ELECTRODE AND THE LINING} \end{cases}$

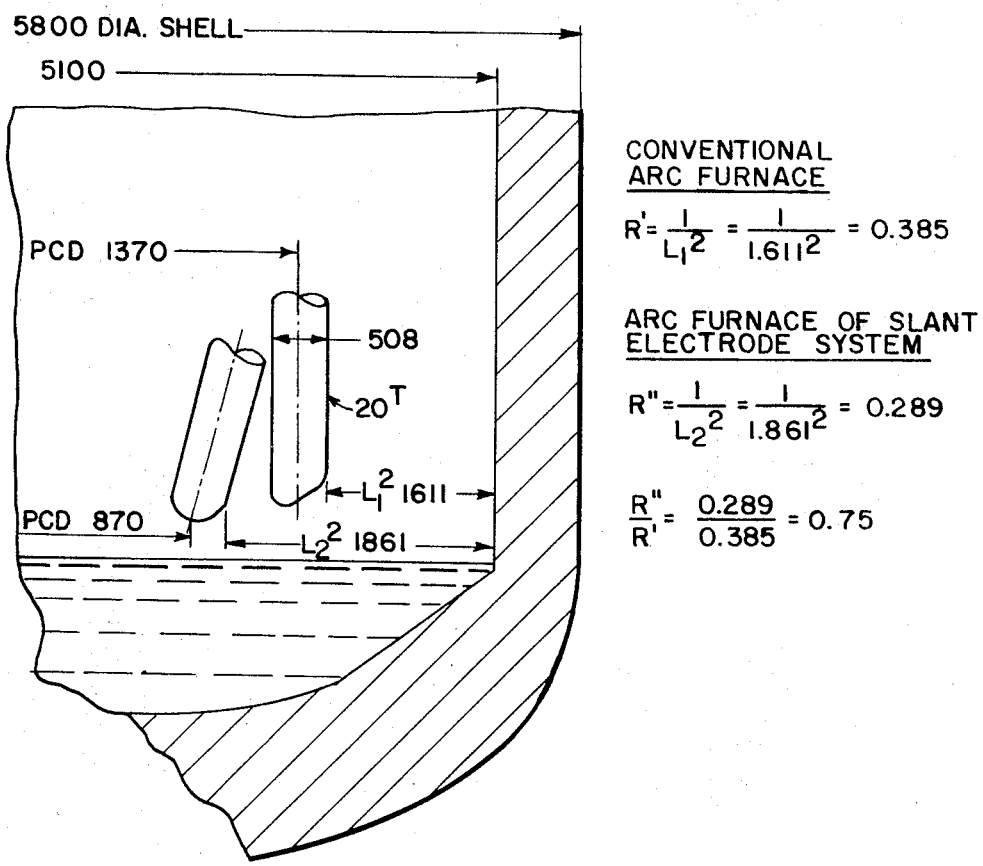

CONVENTIONAL ARC FURNACE $$R' = \frac{1}{L_1^2} = \frac{1}{1.611^2} = 0.385$$

ARC FURNACE OF SLANT ELECTRODE SYSTEM $$R'' = \frac{1}{L_2^2} = \frac{1}{1.861^2} = 0.289$$

$$\frac{R''}{R'} = \frac{0.289}{0.385} = 0.75$$

HEATING METHOD FOR DIRECT-ARC FURNACE

BRIEF SUMMARY OF THE INVENTION

The present invention relates to a heating method for direct-arc furnace.

The primary object of the present invention is to eliminate the defects encountered in the conventional three-phase AC arc furnaces such as nonuniform melting, hot spot phenomenon on the furnace wall, refractory unbalanced three-phase powers and the flicker phenomenon.

In the conventional three-phase AC arc furnaces, the electrodes for generating arcs are arranged to vertically move and make electrical contact with the charge or scrap. When such furnaces are employed in steel production, the following defects are generally observed:

1. The electrodes are spaced apart from each other by a relatively long distance in order that the material such as scrap metal charged in the furnace may be uniformly melted. Therefore when the furnace wall is exposed as the melting operation progresses (that is when the flat bath state is reached), local breakage of the furnace wall refractory (hot spot phenomenon) tends to occur because of the heat radiation from the arcs and the arc flares directed toward the furnace wall. The degree or magnitude of the damage to the refractory of the furnace wall may be expressed by the following relation and is increased in inverse proportion to the square of the distance between each of the electrodes and the wall.

$$R_E = K \frac{P_A \cdot V_A}{L^2} \quad (MWV/m^2) \qquad (1)$$

where $R_E$ = refractory damage index (index of heat absorbed by per unit area of the refractory)
$P_A$ = arc power (MW/pole)
$V_A$ = arc voltage (V)
$L$ = the minimum distance (in meters) between an electrode and the refractory, and
$K$ = coefficient It is very disadvantageous for proper melting to make the distance between the electrode and the refractory any shorter, in order to decrease the extent of the hot spot phenomenon. Furthermore, it is readily seen from Eq. (1) that the higher the damage to the refractory, the higher the power.

(2) In the conventional electrode arrangement, the length of the central electrode is shorter and is influenced by the flux leakage from the side electrodes so that the impedance of the center electrode circuit becomes smaller, thereby bringing about the unbalanced three-phase powers. Therefore, the charge or scrap is not melted uniformly and especially the furnace wall refractory opposite the center electrode is subjected to the hot spot phenomenon. The circuit impedance is given by the following relation:

$$Z = R + j\omega L_e \quad (\text{ohm}) \qquad (2)$$

where $Z$ = circuit impedance in ohm
$R$ = resistance of conductor in ohm
$\omega = 2\pi f$ ($f$ = frequency) and
$L_e$ = effective inductance in H.

The effective impedance of each phase when the balanced three-phase current flows may be expressed by the following equations:

$$\begin{aligned}
L_{e1} &= l_1 \left( \log_e \frac{D_{12}}{R_1} + \log_e \frac{D_{23}}{R_1} \right) \times 10^{-9} \\
L_{e2} &= l_2 \left( \log_e \frac{D_{21}}{R_2} + \log_e \frac{D_{23}}{R_2} \right) \times 10^{-9} \\
L_{e3} &= l_3 \left( \log_e \frac{D_{31}}{R_3} + \log_e \frac{D_{32}}{R_3} \right) \times 10^{-9}
\end{aligned} \qquad (3)$$

where $L_{e1}$ to $L_{e3}$ = effective inductance of each phase (H)
$D_1$ to $D_3$ = distance between different phase conductors (geometrical average distance between different phase in meters)
$R_1$ to $R_3$ = extension of one phase of conductors (geometrical average distance, in meters)

The length of the center electrode or conductor is shorter and has a smaller resistance R. It is further influenced by the leakage flux from the other conductors or electrodes so that its effective inductance $L_e$ is smaller. Thus, the circuit impedance of the center electrode becomes smaller. The unbalanced effective arc power due to unbalanced impedance becomes more remarkable as the operating current is increased.

There has been known in the art the arc furnace in which the side electrodes or conductors are made shorter than the center electrode or conductor and the electrodes are arranged in the form of an inverted triangle in order to balance the three-phase power and to prevent the hot-spot phenomenon of the furnace wall refractory opposite to the center electrode. In this case, the dimensions of the electrode holders are limited so that the electrodes are in some cases spaced apart from each other by a distance longer than the one used in above described conventional furnace. Therefore, the distance between the electrode and the furnace wall refractory is further reduced so that the hot spot phenomenon tends to occur more remarkably. The increased spacing between the electrodes means the increase of the geometrical average distance between the different phase electrodes so that the effective impedance is increased, thereby increasing the furnace circuit impedance. Thus, the voltage drop in the arc generating circuit is increased so that the power cannot be utilized efficiently.

In the conventional arc furnaces of the type in which the electrodes are arranged in a conventional manner, the spacing between the electrodes cannot be reduced sufficiently because of the limit imposed by the dimensions of the electrode holders even though it is tried to minimize the hot spot phenomenon by reducing the spacing. This tendency will become more remarkable when electrodes having a large diameter are used in high power operation (HP→UHP).

The spacing between the different phase conductors on the side of the primary winding of the furnace transformer is varied by the variation of the height of the electrode supporting arm, but may be regarded as constant during the whole process of melting and refining so that the impedance of the circuit on the side of the secondary winding of the furnace transformer may remain unchanged.

Therefore, there are two problems in furnace operation. That is, i. Especially in case of the furnace having a lower impedance secondary circuit, arcs are unstable and not continuous at the initial stage of melting so that the power is not utilized to its full extent. Furthermore, large current tends to flow due to the short circuit between the electrodes and the scrap metal or the arcs are extinguished so that variation in voltage of the power source (flicker phenomenon) occurs and presents another problem.

ii. In case of the furnace having a large impedance secondary circuit, the arcs are stable at the initiation of melting and the flicker phenomenon presents no problem. But the power cannot be utilized to its full extend even after reaching the stage at which the arcs are stabilized.

Generally the following methods are employed in order to prevent the flicker.

A. On the side of the power source system:
1. The system is changed so that more power may be supplied.
2. Capacitors are connected in series to the power source.
3. Boosters or compensation coupling reactors are interconnected between the bus to the arc furnace and a bus to other loads.

B. Within arc furnace plants:
1. A series reactor is connected to the primary of the furnace transformer.
2. A saturable reactor is connected in series to the primary of the furnace transformer.
3. Saturable reactors are connected in parallel with the primary of the furnace transformer.

4. A buffer reactor is connected between the power source and the furnace transformer and a synchronous phase modifier is connected in parallel.

However, the cost of providing such remedies often is almost equal to the cost of installing an arc furnace. For this reason development of the arc furnace has been hindered by the indicated problems.

In case of steel production by arc furnaces which has been operated recently at increased power, the above described problems have still not been solved satisfactorily. Therefore, especially in case of high power arc furnaces, it is extremely difficult to operate them at full capacity.

According to the present invention, the electrodes in the three-phase AC arc furnace are obliquely moved so that they are initially spaced apart from each other by a relatively longer distance, in the upper space of the furnace, and the spacing is gradually reduced as they are lowered. By this operation, the mutual geometrical average distances between the several electrodes (constituting the respective phase secondary conductors) and also between their current supply leads (flexible cables and buses upon suitable arms) are increased, thereby increasing the circuit impedance when the tips of the electrodes are still in the upper portion of the furnaces. On the other hand, when the tips of the electrodes are lowered, their mutual geometrical average distances are reduced, so that the circuit impedance is reduced. Thus, in the initial stage when the tips of the electrodes are still in the upper portion of the furnace, the mutual distances between the flexible cables, buses upon the arms and the electrodes are relatively longer, so that the arcs may be stabilized in a relative high furnace while the flicker can be prevented, thereby uniformly melting the charge. As the melting operation progresses, the three mutual distances between electrode cable and bus system are gradually reduced. When electrodes reach the bottom of the furnace and the molten metal bath is formed therein so that the conditions for stabilizing the arcs at the tips of the electrodes are satisfied, the mutual distances between the electrode, cable and bus systems are minimized. In the flat bath state where the furnace wall is exposed, the low impedance high current-short arcs are concentrated to the center of the molten metal so that the efficiency of transmission of heat generated by the arcs to the molten metal may be remarkably improved while the hot spot phenomenon of the furnace wall refractory may be prevented, thereby permitting quick temperature rise.

Thus, it will be understood that a high power three-phase AC arc furnace using the present invention can operate at full capacity, thus bringing about various advantages in the steel production.

The above and other objects, features and advantages of the present invention will become more apparent from the following description of the illustrative embodiments thereof taken in conjunction with the accompanying drawing.

BRIEF DESCRIPTION OF THE DRAWING

FIGS. 1 to 4 are plan views of heating systems according to the present invention;

FIG. 5 is a side view illustrating the essential parts of a direct-arc furnace shown in FIG. 1; and FIG. 6 is a comparative FIG. showing the refractory damage index $R_E$ of the furnace wall.

DESCRIPTION OF THE PREFERRED EMBODIMENTS

Referring to FIGS. 1 and 2, reference numeral 1 denotes a furnace; 2, a center electrode; and 3, side electrodes. Secondary conductors, supplying current to the electrodes, are shown in form of elements 2' and 3', electrode supporting arms; and 4 and 5, masts for raise and lowering these arms and thereby the electrodes 2 and 3. The electrodes are so arranged that the tips thereof are spaced apart from each other along a circle having a diameter $D$ by a relatively long distance, but their spacing is gradually reduced as they are moved downwardly and are finally arranged along a circle having a diameter of $d$. In the first embodiment shown in FIG. 1, the circles $D$ and $d$ are coaxial so that the paths of the electrodes form the respective sides of an inverted frustum of triangular pyramid. The same is true in case of the second embodiment shown in FIG. 2, but the circle $d$ is not coaxial with the circle $D$.

FIGS. 3 and 4 illustrate the embodiments in which arm 2', as shown, as well as the length of the center electrode 2 is longer than those of the side electrodes 3. However, the paths of the movements of these electrodes 2 and 3 correspond to those of the embodiments shown in FIGS. 1 and 2 respectively.

All of the arrangements described above serve to maintain the three-phase powers in equilibrium or balanced state as described hereinbefore. The arrows shown in FIGS. 1 and 2 indicate the downward directions of the electrodes.

Referring to FIG. 5 illustrating the essential parts of the embodiment shown in FIG. 1, like numerals are used to designate like parts. Reference numeral 6 designates a roof; 7, the scrap or charge not melted; and 8, a flat bath of melted charge. Through suitable guides, including apertures in roof 6, oblique electrodes 2 and 3 are lowered along their axes to bring their tips from the circle $D$ at the upper portion of the furnace 1 toward the circle $d$ in closely spaced apart relation with the level of the flat bath 8 along the paths indicated by the dotted lines.

At the initial stage of melting, the tips of the electrodes 2 and 3 are arranged along the upper circle $D$ so that they are spaced apart from each other by a relatively longer distance. Thus, the circuit impedance of the secondary conductor circuit is relatively high so that the arc can be stabilized and the flicker phenomenon can be prevented whereby the scrap or charge 7 may be rapidly and uniformly melted. As the melting operation is advanced, the spacing between the tips of the electrodes is gradually reduced as the electrodes are lowered.

When all of the scrap or charge 7 is melted into the flat bath 8, the tips of the electrodes 2 and 3 are positioned along the smaller circle $d$ so that the impedance of the secondary conductor circuit becomes lower. Thus, the heat generated by the arcs can be concentrated at the center portion of the flat bath 8 so that the efficiency of transmitting the heat from the arcs to the molten metal can be remarkably improved, thereby preventing the hot spot phenomenon of the furnace wall refractory and permitting the molten metal temperature to increase at high velocity.

According to the embodiments shown in FIGS. 3 and 4, the longer center electrode 2 may be employed without spacing apart the electrodes by a longer distance (in the flat bath state) and the electrodes may be arranged to form the sides of an inverted frustum of triangular pyramid. Thus, the unbalanced impedance of the three-phase circuit and the hot-spot phenomenon on the elevating masts may be advantageously eliminated.

For the better understanding of the present invention, one Example will be described hereinafter.

An arc furnace having the nominal capacity of 70 tons, the shell diameter of 5,800 mm., the capacity of the transformer of 42,000 kva. and the electrode diameter of 20 inches was used. The electrodes were arranged as in the case of the embodiment shown in FIG. 1. The angle of inclination of each electrode was 5°. The results of the analyses based upon the circuit impedance short circuit tests at the upper limit position of the electrodes, at the position 100 mm. above the level of the flat bath and at the lower limit position of the electrodes, were as shown in Table 1.

TABLE 1.—COMPARISON OF CIRCUIT IMPEDANCE AT THE POSITION OF THE ELECTRODES

| | Lower limit position of the electrodes | | Position 100 mm. above the level of the flat bath | | Upper limit position of the electrodes | |
|---|---|---|---|---|---|---|
| | Central phase | Both sides phase | Central phase | Both sides phase | Central phase | Both sides phase |
| Furnace transformer | | $\dot{Z}=(0.155+j0.775)\times10^{-3}\Omega$ $Z=0.79\times10^{-3}\Omega$ | | $\dot{Z}=(0.155+j0.775)\times10^{-3}\Omega$ $Z=0.790\times10^{-3}\Omega$ | | $\dot{Z}=(0.155+j0.775)\times10^{-3}\Omega$ $Z=0.790\times10^{-3}\Omega$ |
| Circular generation line at electricity chamber | $\dot{Z}=(0.0302+j0.173)\times10^{-3}\Omega$ $Z=0.176\times10^{-3}\Omega$ | $\dot{Z}=(0.0215+j0.260)\times10^{-3}\Omega$ $Z=0.261\times10^{-3}\Omega$ | $\dot{Z}=(0.0302+j0.173)\times10^{-3}\Omega$ $Z=0.176\times10^{-3}\Omega$ | $\dot{Z}=(0.0215+j0.260)\times10^{-3}\Omega$ $Z=0.261\times10^{-3}\Omega$ | $\dot{Z}=(0.0302+j0.173)\times10^{-3}\Omega$ $Z=0.176\times10^{-3}\Omega$ | $\dot{Z}=(0.0215+j0.260)\times10^{-3}\Omega$ $Z=0.261\times10^{-3}\Omega$ |
| Water cooled cable | $\dot{Z}=(0.0283+j0.502)\times10^{-3}\Omega$ $Z=0.503\times10^{-3}\Omega$ | $\dot{Z}=(0.0283+j0.390)\times10^{-3}\Omega$ $Z=0.391\times10^{-3}\Omega$ | $\dot{Z}=(0.0283+j0.543)\times10^{-3}\Omega$ $Z=0.544\times10^{-3}\Omega$ | $\dot{Z}=(0.0283+j0.444)\times10^{-3}\Omega$ $Z=0.445\times10^{-3}\Omega$ | $\dot{Z}=(0.0283+j0.608)\times10^{-3}\Omega$ $Z=0.609\times10^{-3}\Omega$ | $\dot{Z}=(0.0283+j0.526)\times10^{-3}\Omega$ $Z=0.527\times10^{-3}\Omega$ |
| Circular generation line at the position of the electrode supporting | $\dot{Z}=(0.0234+j1.12)\times10^{-3}\Omega$ $Z=1.13\times10^{-3}\Omega$ | $\dot{Z}=(0.0208+j1.06)\times10^{-3}\Omega$ $Z=1.06\times10^{-3}\Omega$ | $\dot{Z}=(0.0234+j1.23)\times10^{-3}\Omega$ $Z=1.23\times10^{-3}\Omega$ | $\dot{Z}=(0.0208+j1.15)\times10^{-3}\Omega$ $Z=1.15\times10^{-3}\Omega$ | $\dot{Z}=(0.0234+j1.38)\times10^{-3}\Omega$ $Z=1.38\times10^{-3}\Omega$ | $\dot{Z}=(0.0208+j1.28)\times10^{-3}\Omega$ $Z=1.28\times10^{-3}\Omega$ |
| Electrode | $\dot{Z}=(0.241+j0.595)\times10^{-3}\Omega$ $Z=0.642\times10^{-3}\Omega$ | | $\dot{Z}=(0.241+j0.676)\times10^{-3}\Omega$ $Z=0.717\times10^{-3}\Omega$ | | $\dot{Z}=(0.241+j0.856)\times10^{-3}\Omega$ $Z=0.890\times10^{-3}\Omega$ | |
| Total | $\dot{Z}=(0.478+j3.17)\times10^{-3}\Omega$ $Z=3.21\times10^{-3}\Omega$ | $\dot{Z}=(0.466+j3.08)\times10^{-3}\Omega$ $Z=3.11\times10^{-3}\Omega$ | $\dot{Z}=(0.478+j3.10)\times10^{-3}\Omega$ $Z=3.13\times10^{-3}\Omega$ | $\dot{Z}=(0.466+j3.30)\times10^{-3}\Omega$ $Z=3.34\times10^{-3}\Omega$ | $\dot{Z}=(0.478+j3.70)\times10^{-3}\Omega$ $Z=3.82\times10^{-3}\Omega$ | $\dot{Z}=(0.466+j3.70)\times10^{-3}\Omega$ $Z=3.73\times10^{-3}\Omega$ |
| Average | $\dot{Z}=(0.470+j3.11)\times10^{-3}\Omega$ $Z=3.14\times10^{-3}\Omega$ | | $\dot{Z}=(0.470+j3.33)\times10^{-3}\Omega$ $Z=3.37\times10^{-3}\Omega$ | | $\dot{Z}=(0.470+j3.73)\times10^{-3}\Omega$ $Z=3.76\times10^{-3}\Omega$ | |

It will be readily seen that the difference in the circuit impedances at the upper and lower limit positions of the electrodes reaches 20 percent so that the circuit impedance is self-controlled depending upon the melting operation. According to this Example, it is expected that the melting time may be reduced by 15 percent and the refining time, by 10 percent.

The pitch circle diameter (p.c.d.) of the tips of the electrodes in the flat bath state becomes 870 mm. in diameter so that it is expected the service life of the refractory of the furnace wall will be increased by approximately 25 percent. (See FIG. 6).

In the higher power three-phase AC arc furnaces it is required that the secondary circuit impedance must be reduced as much as possible in order to improve the high energy arc heat transmission efficiency and to reduce the power loss in the secondary conductor circuit. On the other hand, in case of the operation with a high current in a low impedance circuit, the arcs are not stabilized at the initiation of melting while the flicker phenomenon occurs. From the foregoing, it will be seen that the present invention has succeeded to solve these two contradicting fundamental problems and to eliminate the hot spot phenomenon of the furnace wall refractory. Without any additional installation or equipment and control, the following advantages accrue from the present invention.

i. At the initial stage, the arcs may be stabilized because of a relatively higher furnace circuit impedance while the flicker phenomenon can be prevented; and ii. When the charge is melted so that the molten bath is formed and the conditions for stabilizing the arcs (even with the tips of the electrode lowered) are satisfied, the low impedance and high power operation may be carried out so that the heat produced by the arcs may be concentrated at the center of the molten bath thereby eliminating the hot spot phenomenon of the furnace wall refractory.

The present invention, accordingly permits the extremely effective use of the high energy arc, thereby melting the charge rapidly and increasing the temperature at high velocity. Especially the high power arc furnaces may be operated with remarkably increased efficiency.

We claim:

1. A heating method for direct arc furnaces, comprising the steps of obliquely arranging the furnace electrodes; obliquely lowering them into the furnace charge during the melting of this charge to operate the furnace at relatively high but gradually decreasing impedances during this melting; and thereafter operating the furnace at relatively low impedance, established with the aid of this lowering of the electrodes.

2. A method according to claim 1 wherein the obliquity of the electrode arrangement and of the lowering motion is 5° from the vertical.

3. A method according to claim 1 wherein the difference between the relatively high and low impedances ranges up to 20 percent.